(12) United States Patent
Yao et al.

(10) Patent No.: US 11,114,834 B2
(45) Date of Patent: Sep. 7, 2021

(54) STRAIN BACKUP INTEGRATED DEVICE CARBON FIBER WIRE

(71) Applicant: JIANGSU TIANNAN ELECTRIC POWER EQUIPMENT CO., LTD., Jiangsu (CN)

(72) Inventors: JianSheng Yao, Jiangsu (CN); Xiaoqiang Zhu, Jiangsu (CN); DongYu Yao, Jiangsu (CN); XiaoLong Shi, Jiangsu (CN); YaYong Si, Jiangsu (CN); ShuPeng Tian, Jiangsu (CN); MengMeng Gao, Jiangsu (CN); YiXiang Zhou, Jiangsu (CN)

(*) Notice: Subject to any disclaimer, the term of this patent is extended or adjusted under 35 U.S.C. 154(b) by 1 day.

(21) Appl. No.: 16/763,972

(22) PCT Filed: Oct. 10, 2018

(86) PCT No.: PCT/CN2018/109603
§ 371 (c)(1),
(2) Date: May 13, 2020

(87) PCT Pub. No.: WO2019/242165
PCT Pub. Date: Dec. 26, 2019

(65) Prior Publication Data
US 2020/0350752 A1  Nov. 5, 2020

(30) Foreign Application Priority Data

Jun. 17, 2018  (CN) .......................... 201810625019.3

(51) Int. Cl.
*H02G 7/02*  (2006.01)
*H02G 7/05*  (2006.01)

(52) U.S. Cl.
CPC ............... *H02G 7/02* (2013.01); *H02G 7/053* (2013.01)

(58) Field of Classification Search
CPC ............ H02G 7/02; H02G 7/053; H02G 7/04; H02G 7/125; H02G 7/20; H02G 7/18;
(Continued)

(56) References Cited

U.S. PATENT DOCUMENTS 2,654,796 A * 10/1953 Hubbard ................ H02G 7/056
254/232
3,978,276 A *  8/1976 Poffenberger ......... H02G 7/125
174/42

(Continued)

FOREIGN PATENT DOCUMENTS

CN  203983912 U  12/2014
CN  204497698 U   7/2015
(Continued)

OTHER PUBLICATIONS

International search report of PCT/CN2018/109603.

*Primary Examiner* — Angel R Estrada

(57) ABSTRACT

A complete set of tension backup device for carbon fiber wire, consisting of a backup tension device, a performed armor rod, a parallel hanging plate, an adapter base, a wire drawing device, a support damper clamp, a U-shaped pulling ring, a triangular hanging plate, and a tensioning device. The backup tension device is a backup strain clamp in a wedge-shaped structure. The support damper clamps are provided on carbon fiber split wires between an original strain clamp and the backup tension device, and arranged at intervals of 3-4 meters.

5 Claims, 5 Drawing Sheets

(58) Field of Classification Search
CPC ............ H02G 1/04; H02G 1/00; H01H 33/00; H01H 33/02
USPC ..... 174/45 TD, 40 R, 42, 45 R, 40 TD, 177, 174/169, 146, 138 R, 68.1, 68.3, 73.1, 174/74 R, 70 A; 254/134.3 R, 134.3 PA; 200/48 R
See application file for complete search history.

(56) References Cited

U.S. PATENT DOCUMENTS

| | | | | |
|---|---|---|---|---|
| 4,679,672 | A * | 7/1987 | Seddon | B60M 1/20 174/45 R |
| 4,814,550 | A * | 3/1989 | Newberg | H02G 1/02 174/138 R |
| 5,581,051 | A * | 12/1996 | Hill | H01H 31/00 174/138 R |
| 7,977,571 | B2 * | 7/2011 | Devine | H02G 7/02 174/45 TD |
| 10,811,858 | B2 * | 10/2020 | Schumann | H02G 7/056 |

FOREIGN PATENT DOCUMENTS

| | | |
|---|---|---|
| CN | 105140863 A | 12/2015 |
| JP | 2001231137 A | 8/2001 |

* cited by examiner

STRAIN BACKUP INTEGRATED DEVICE CARBON FIBER WIRE

CROSS REFERENCE TO RELATED APPLICATION

This application is a continuation of International Patent Application No. PCT/CN2018/109603, filed on Oct. 10, 2018, which claims priority benefit of Chinese Patent Application No. 201810625019.3, filed on Jun. 17, 2018, and the entire contents of which are incorporated herein by reference.

TECHNICAL FIELD

The present disclosure relates to a safety protection device for power transmission and distribution lines in the power industry, in particular to a complete set of tension backup device for carbon fiber wire.

BACKGROUND

According to the relevant patent documents, no complete set of tension backup device for carbon fiber wire with the same structure as the present disclosure has been retrieved. With the rapid development of electric power industry, carbon fiber wire has been applied in many lines in China. In the process of construction, the damage or even breakage of internal mandrel at the end of the carbon fiber wire are easy to occur during the pressed crimping of carbon fiber wires by strain clamps and the setting of the carbon fiber wires, and these damages has no reliable detection means so far. The mandrel breakage in some lines eventually causes the breakage and hanging of the whole wire, leading to line outage and power cut. Since there are more and more lines crossing high-speed railway, highway and important transmission channel sections, and the consequences are unimaginable if the wire breakage and hanging is occurred. Therefore, it is necessary to design a complete set of tension backup device for carbon fiber wire to protect the wire within 50 m from the outlet of strain clamp to ensure that the wires will be continued tighten by the backup tension device when the wire core breakage or the original compression strain clamp failure is occurred within this range, so as to avoid the accident caused by the wire falling, and win precious time for emergency repair, so as to meet the development needs of modern power grid.

SUMMARY

The object of the present disclosure is to provide a complete set of tension backup device for carbon fiber wire which can effectively pull the wire, prevent the wire from falling, share the tension of the original strain clamp and improve the service life of the original strain clamp when the core of the carbon fiber wire within 50 m of the outlet of the original strain clamp is broken without changing the original line structures.

In order to achieve the above object, the technical solution of the present disclosure is shown as below:

A complete set of tension backup device for carbon fiber wire, including a backup tension device, a performed armor rod a parallel hanging plate, an adapter base, a wire drawing device, a support damper clamp, U-shaped pulling ring, a triangular hanging plate and a tensioning device. The surface of the carbon fiber wire at installation position of the backup tension device is provided with the performed armor rod. A hanging plate of the backup tension device is connected to the adapter base through the parallel hanging plate and the tensioning device. One end of the wire drawing device is connected to the adapter base through the U-shaped pulling ring, the other end is connected to the tensioning device arranged on the triangular hanging plate. The triangular hanging plate is arranged on a fixed pole tower. The backup tension device is a wedge-shaped backup strain clamp; the performed armor rod is a wear-resistant pre-twisted wire. The support damper clamp is arranged on carbon fiber split wire between an original strain clamp and the backup tension device and arranged at intervals of 3-4 meters. The tensioning device is a turn buckle with a closed-loop buckle at both ends.

The backup tension device includes a housing, an inner wedge and the hanging plate, one end of the inner wedge is arranged in the housing, the other end is provided with a bolt fastening hole; two sides of the housing are symmetrically provided with an trunnion connected to the hanging plate, the hanging plate is arranged on the trunnion and is limited by a cotter pin, and the hanging plate is able to rotate around the trunnion; the housing is made of two identical structures with grooves, the two identical structures with grooves are fastened by bolts, and a wedge-shaped cavity matching the inner wedge is formed in the housing; the inner wedge is made of two symmetrical wedge-shaped bodies, a wire guide groove with a shape fitted with an outer shape of the carbon fiber wire is formed between a joint surface; and an outer surface of the housing is designed as a circular arc surface structure, which effectively prevents stress concentration and tip discharge.

The adapter base includes a base body and a connecting ear plate, the base body is a disc structure, and 3-8 of the connecting ear plates are uniformly arranged on an circumference of the base body in a trumpet structure, wherein the number of the connecting ear plates is based on the number of carbon fiber split wires; the connecting ear plate is provided with a bolt hole connected to the parallel hanging plate.

The wire drawing device includes a steel strand and a steel anchor, and the steel anchor is crimped at both ends of the steel strand.

The support damper clamp includes a hose clamp, a frame plate, a clamp body, a clamp cover plate, a rubber tile, wherein the hose clamp is welded on the frame plate, the clamp body is fixed on the frame plate through bolts, the clamp cover plate is hinged with the clamp body, and is locked on the clamp body through a closed pin shaft; inner surfaces of the clamp body and the clamp cover plate are provided with the rubber tiles.

When in use, the performed armor rod is wrapped at the position within 50 m from the outlet of the original compression type strain clamp of the carbon fiber wire that needs to be backed up, then the backup tension device is installed on the carbon fiber wire wrapped with the performed armor rod, Selecting the appropriate adapter base according to the number of split wires, and the hanging plate on the backup tension device is connected to the connecting ear plate on the adapter base through the tensioning device and the parallel hanging plate. The triangular hanging plate is installed on the pole and tower, selecting the appropriate length of wire drawing device according to the distance between the triangular hanging plate and the adapter base. And the adapter base and the triangular hanging plate are connected each other through the tensioning device. The support damper clamp is installed, and the distance between each support damper clamp is 3-4 m, the hose clamp in the support damper clamp is tightly held on the steel strand of the wire drawing device, adjusting the wire drawing device between the backup tension device and the adapter base to balance the backup tension device on each wire with the adapter base. And finally adjusting the tensioning device between the triangular hanging plate and the wire drawing device, to make the wire drawing device draw the backup tension device connected to the adapter base, so as to backup the tension stress.

The present disclosure has the advantages as follows: Since the wedge-shaped backup tension device is provided, so as to facilitate installation and provides a large gripping force for the carbon fiber wire. The outer surface of the backup tension device is designed to be of an arc structure, thereby effectively preventing stress concentration, which has a reliable structure. Because the performed armor rod is a wear-resistant pre-twisted wire, thereby the outer surface of the carbon fiber wire can be effectively protected and is easy to install. Due to the setting of the adopter base, mutiple backup tension devices on split wires can be gathered and one wire drawing device is used, to make the structure simple. By using the support damper clamp, the protection of the outer surface of the carbon fiber wire can be achieved, at the same time, the carbon fiber wire can be reliably stretched out by using the support damper clamps, so that the backup tension device will not collide with the wire, so as to prolong the service life of the wire. By providing of the tensioning device, it can convenient to adjust the tightness and tension. Due to the reasonable structure and convenient use, it has great practical and promotional value.

BRIEF DESCRIPTION OF THE DRAWINGS

The present disclosure will be further described as follows in combination with the accompanying drawings.

DETAILED DESCRIPTION OF THE EMBODIMENTS

Figure 1:
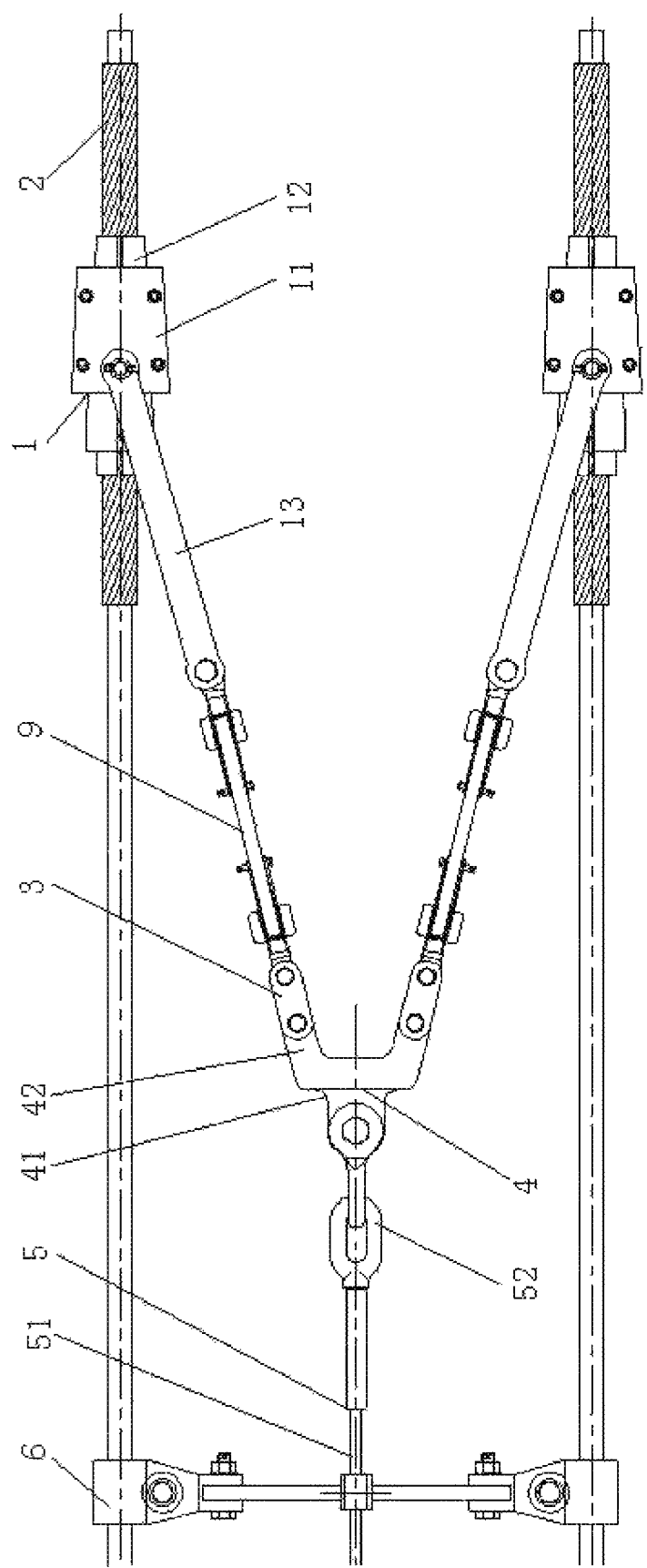
FIG. 1 is a structural diagram of a complete set of tension backup device for carbon fiber wire of the present disclosure.
Figure 2:
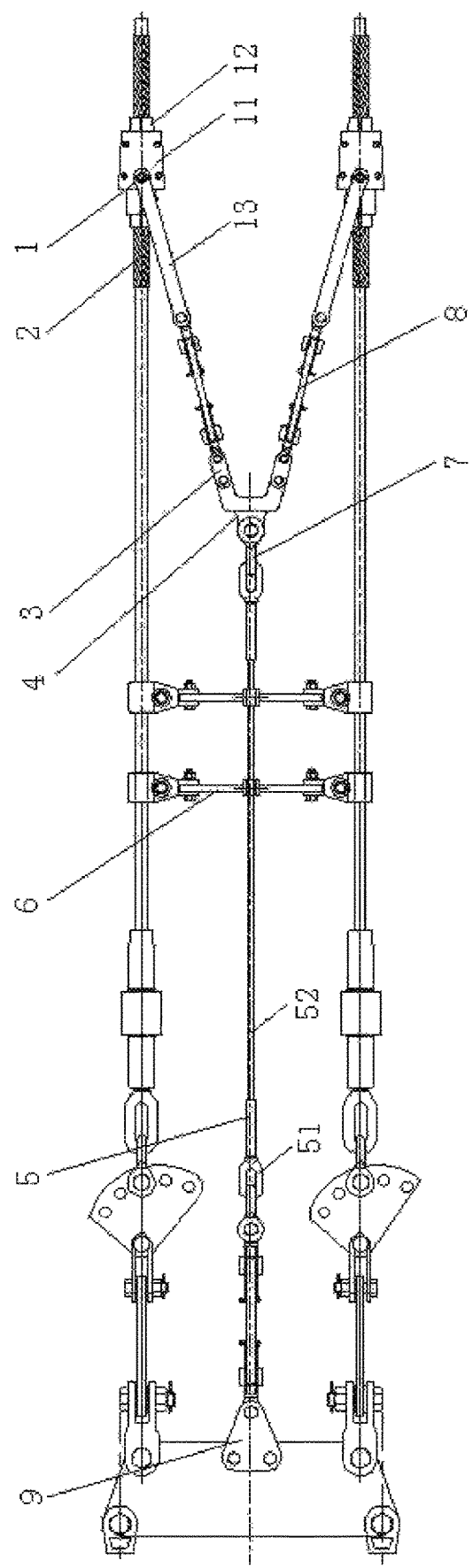
FIG. 2 is a partial enlarged view of FIG. 1.
Figure 3:
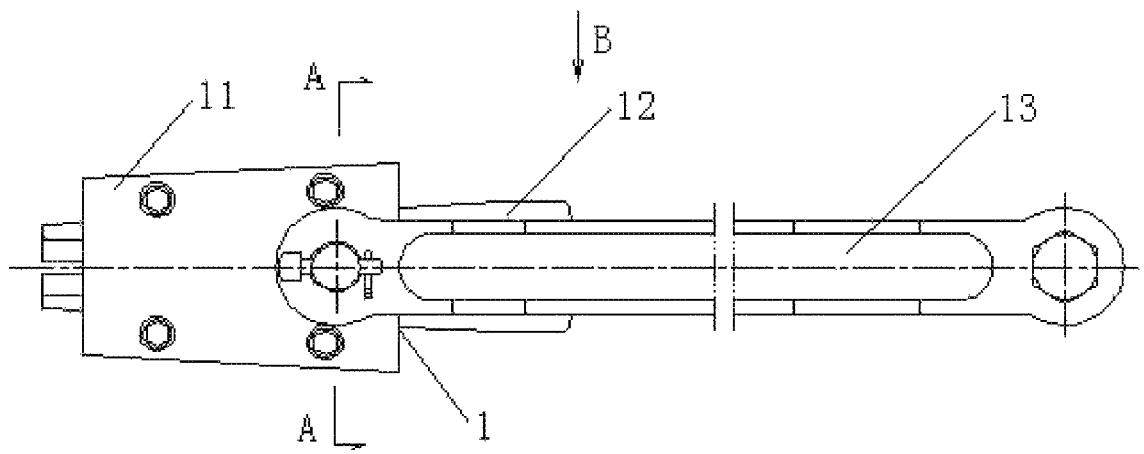
FIG. 3 is the structural diagram of a backup tension device of the complete set of backup tension device of the carbon fiber wire of the present disclosure.
Figure 4:
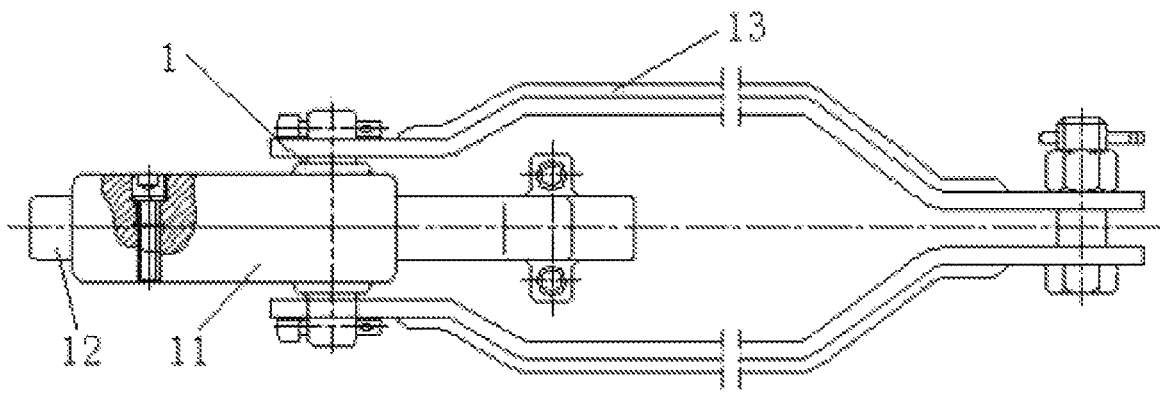
FIG. 4 is a B-direction structure diagram of FIG. 3.
Figure 5:
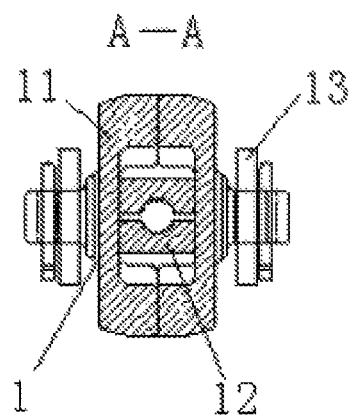
FIG. 5 is A-A sectional view of FIG. 3.
Figure 6:
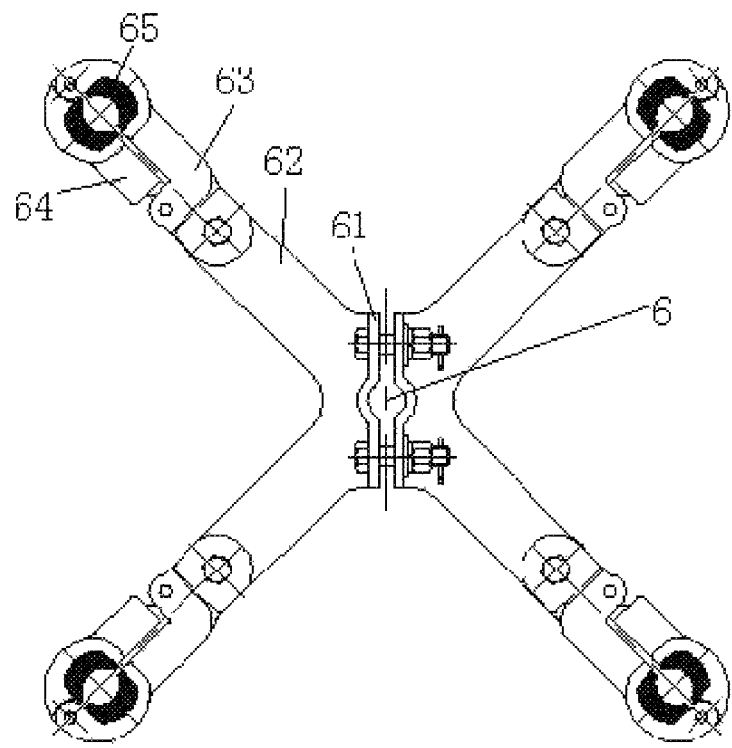
FIG. 6 is the structural diagram of a support damper clamp by the complete set of tension backup device for carbon fiber wire of the present disclosure.
Figure 7:
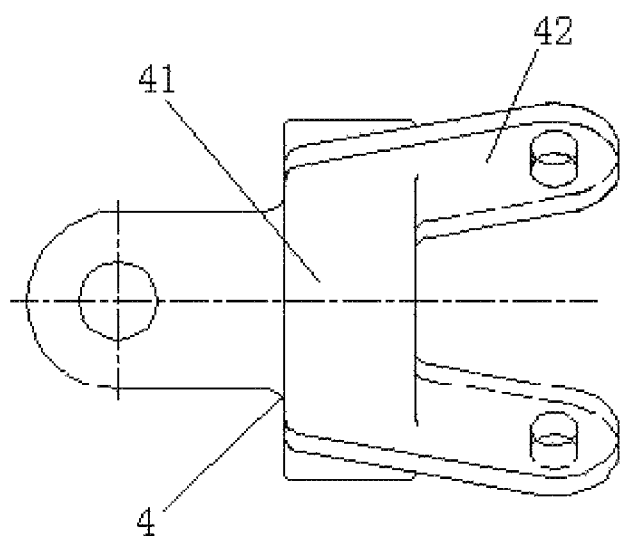
FIG. 7 is a three-dimensional structure diagram of an adapter base of the complete set of tension backup device for carbon fiber wire of the present disclosure.
Figure 8:
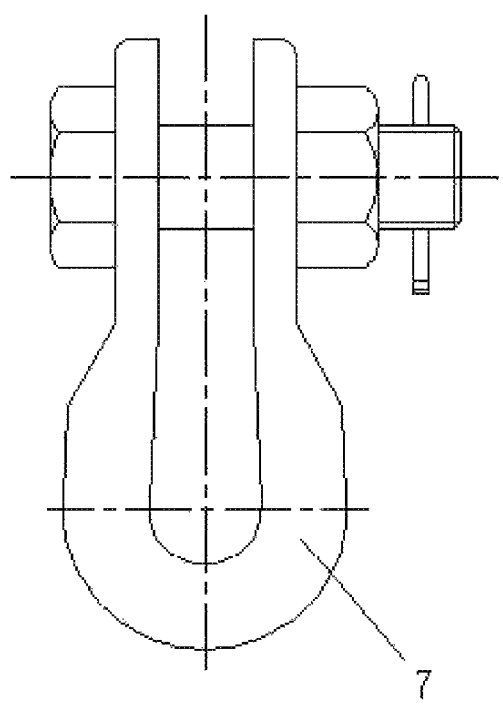
FIG. 8 is a structural diagram of an U-shaped pulling ring of the complete set of backup tension device for the carbon fiber wire of the present disclosure.
Figure 9:
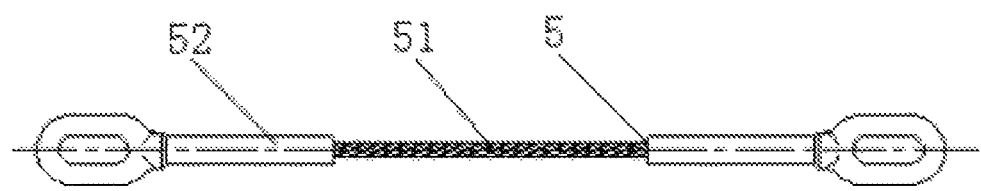
FIG. 9 is a structural diagram of a wire drawing device of the complete set of tension backup device for carbon fiber wire of the present disclosure.

Referring to FIG. 1, FIG. 2, FIG. 3, FIG. 4, FIG. 5, FIG. 6, FIG. 7, FIG. 8 and FIG. 9, the complete set of tension backup device for carbon fiber wire of the present disclosure is composed of backup tension device 1, a performed armor rod 2, a parallel hanging plate 3, an adapter base 4, a wire drawing device 5, a support damper clamp 6, U-shaped pulling ring 7, a triangular hanging plate 8 and a tensioning device 9. The surface of the carbon fiber wire at the installation position of the backup tension device 1 is provided with the performed armor rod 2. A hanging plate 13 of the backup tension device 1 is connected to the adapter base 4 through the parallel hanging plate 3 and the tensioning device 9. One end of the wire drawing device 5 is connected to the adapter base 4 through the U-shaped pulling ring 7, the other end is connected to the tensioning device 9 arranged on the triangular hanging plate 8, and the triangular hanging plate 8 is arranged on a fixed pole tower. The backup tension device 1 is a wedge-shaped backup strain clamp. The performed armor rod 2 is a wear-resistant pre-twisted wire. The support damper clamp 6 is arranged on carbon fiber split wires between an original strain clamp and the backup tension device 1 and arranged at intervals of 3-4 meters. The tensioning device 9 is a turn buckle with a closed-loop buckle at both ends. The backup tension device 1 is composed of a housing 11, an inner wedge 12 and the hanging plate 13. One end of the inner wedge 12 is arranged in the housing 11, the other end is provided with a bolt fastening hole. Two sides of the housing 11 are symmetrically provided with an trunnion connected to the hanging plate 13, the hanging plate 13 is arranged on the trunnion and is limited by a cotter pin, and the hanging plate is able to rotate around the trunnion. The housing 11 is made of two identical structures with grooves, and the two identical structures with grooves are fastened by bolts, and a wedge-shaped cavity matching the inner wedge 12 is formed in the housing. The inner wedge 12 is made of two symmetrical wedge-shaped bodies, a wire guide groove with the shape fitted with the outer shape of the carbon fiber wire is formed between a joint surface. And the outer surface of the housing 11 is designed as a circular arc surface structure, which effectively prevents stress concentration and tip discharge. The adapter base 4 is composed of a base body 41 and a connecting ear plate 42. The base body 41 is a disc structure, and 3-8 of the connecting ear plates 42 are uniformly arranged on an circumference of the base body 41 in a trumpet structure. The number of the connecting ear plates 42 is based on the number of carbon fiber split wires. The connecting ear plate 42 is provided with a bolt hole connected to the parallel hanging plate 3. The wire drawing device 5 is composed of a steel strand 51 and a steel anchor 52, and the steel anchor 52 is crimped at both ends of the steel strand 51. The support damper clamp 6 is composed of a hose clamp 61, a frame plate 62, a clamp body 63, a clamp cover plate 64, a rubber tile 65, wherein the hose clamp 61 is welded on the frame plate 62, the clamp body 63 is fixed on the frame plate 62 through bolts, the clamp cover plate 64 is hinged with the clamp body 63 and is locked on the clamp body 63 through a closed pin shaft. The inner surfaces of the clamp body 63 and the clamp cover plate 64 are provided with the rubber tiles 65.

What is claimed is:

1. A complete set of tension backup device for carbon fiber wire, comprising a backup tension device (1), a performed armor rod (2), a parallel hanging plate (3), an adapter base (4), a wire drawing device (5), a support damper clamp (6), U-shaped pulling ring (7), a triangular hanging plate (8) and a tensioning device (9), wherein a surface of the carbon fiber wire at installation position of the backup tension device (1) is provided with the performed armor rod (2); a hanging plate (13) of the backup tension device (1) is connected to the adapter base (4) through the parallel hanging plate (3) and the tensioning device (9); one end of the wire drawing device (5) is connected to the adapter base (4) through the U-shaped pulling ring (7), an other end is connected to the tensioning device (9) arranged on the triangular hanging plate (8); the triangular hanging plate (8) is arranged on a fixed pole tower; the backup tension device (1) is a wedge-shaped backup strain clamp; the performed armor rod (2) is a wear-resistant pre-twisted wire; the support damper clamp (6) is arranged on carbon fiber split wire between an original strain clamp and the backup tension device (1) and arranged at intervals of 3-4 meters; the tensioning device (9) is a turn buckle with a closed-loop buckle at both ends.

2. The complete set of tension backup device for carbon fiber wire according to claim 1, wherein the backup tension device (1) comprises a housing (11), an inner wedge (12) and the hanging plate (13), one end of the inner wedge (12) is arranged in the housing (11), an other end is provided with a bolt fastening hole; two sides of the housing (11) are symmetrically provided with an trunnion connected to the hanging plate (13), the hanging plate (13) is arranged on the trunnion and is limited by a cotter pin, and the hanging plate is able to rotate around the trunnion; the housing (11) is made of two identical structures with grooves, the two identical structures with grooves are fastened by bolts, and a wedge-shaped cavity matching the inner wedge (12) is formed in the housing; the inner wedge (12) is made of two symmetrical wedge-shaped bodies, a wire guide groove with a shape fitted with an outer shape of the carbon fiber wire is formed between a joint surface; and an outer surface of the housing (11) is designed as a circular arc surface structure, which effectively prevents stress concentration and tip discharge.

3. The complete set of tension backup device for carbon fiber wire according to claim 1, wherein the adapter base (4) comprises a base body (41) and a connecting ear plate (42), the base body (41) is a disc structure, and 3-8 of the connecting ear plates (42) are uniformly arranged on an circumference of the base body (41) in a trumpet structure, wherein the number of the connecting ear plates (42) is based on the number of carbon fiber split wires; the connecting ear plate (42) is provided with a bolt hole connected to the parallel hanging plate (3).

4. The complete set of tension backup device for carbon fiber wire according to claim 1, wherein the wire drawing device (5) comprises a steel strand (51) and a steel anchor (52), and the steel anchor (52) is crimped at both ends of the steel strand (51).

5. The complete set of tension backup device for carbon fiber wire according to claim 1, wherein the support damper clamp (6) comprises a hose clamp (61), a frame plate (62), a clamp body (63), a clamp cover plate (64), a rubber tile (65), wherein the hose clamp (61) is welded on the frame plate (62), the clamp body (63) is fixed on the frame plate (62) through bolts, the clamp cover plate (64) is hinged with the clamp body (63), and is locked on the clamp body (63) through a closed pin shaft; inner surfaces of the clamp body (63) and the clamp cover plate (64) are provided with the rubber tiles (65).

* * * * *